US006674566B2

(12) United States Patent
Fludger et al.

(10) Patent No.: US 6,674,566 B2
(45) Date of Patent: Jan. 6, 2004

(54) RAMAN AMPLIFICATION

(75) Inventors: Christopher Fludger, South Croydon (GB); Nigel Jolley, Hertfordshire (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/850,760

(22) Filed: May 8, 2001

(65) Prior Publication Data

US 2002/0041430 A1 Apr. 11, 2002

(30) Foreign Application Priority Data

Oct. 5, 2000  (GB) ............................................. 0024453

(51) Int. Cl.[7] ............................................. H01S 3/30
(52) U.S. Cl. ............. 359/334; 359/341.32; 359/341.44; 359/337.2
(58) Field of Search ........................... 359/334, 341.32, 359/341.4, 337.2, 341.44

(56) References Cited

U.S. PATENT DOCUMENTS

| 5,039,199 | A | * | 8/1991 | Mollenauer et al. ......... 359/334 |
| 5,181,210 | A | * | 1/1993 | Chung et al. ................. 372/19 |
| 5,343,320 | A | * | 8/1994 | Anderson ..................... 359/160 |
| 5,764,404 | A | * | 6/1998 | Yamane et al. ............... 359/124 |
| 6,072,614 | A | * | 6/2000 | Roberts ......................... 347/19 |
| 6,081,366 | A | * | 6/2000 | Kidorf et al. ........... 359/341.32 |
| 6,122,298 | A | * | 9/2000 | Kerfoot et al. ................. 372/6 |
| 6,151,160 | A | * | 11/2000 | Ma et al. .................... 359/124 |
| 6,163,636 | A | * | 12/2000 | Stentz et al. ................. 359/124 |
| 6,243,195 | B1 | * | 6/2001 | Pedersen et al. ............. 359/177 |
| 6,292,288 | B1 | * | 9/2001 | Akasaka et al. ............. 359/124 |
| 6,304,368 | B1 | * | 10/2001 | Hansen et al. ............... 359/334 |
| 6,335,820 | B1 | * | 1/2002 | Islam .......................... 359/334 |
| 6,342,965 | B1 | * | 1/2002 | Kinoshita .................... 359/124 |

FOREIGN PATENT DOCUMENTS

| EP | 0 779 687 A | 6/1997 | ............. H01S/3/06 |
| WO | WO 98 42088 A | 9/1998 | ........... H04B/10/17 |
| WO | WO 00 49721 A | 8/2000 | |

OTHER PUBLICATIONS

Fludger CRS et al: "Inline Loopbacks for Improved OSNR and Reduced Double Rayleigh Scattering in Distributed Raman Amplifiers" OFC 2001, pp. MI1/1–3 vol. 1 XP002186141.

* cited by examiner

Primary Examiner—Thomas G. Black
Assistant Examiner—Stephen Cunningham
(74) Attorney, Agent, or Firm—Barnes & Thornburg

(57) ABSTRACT

An optical transmission system comprising a first optical waveguide suitable for transmitting a first information signal, a second optical waveguide suitable for transmitting a second information signal, and input means for providing an electro magnetic radiation signal into said first waveguide, said signal being suitable for providing Raman amplification of the information signals, the system further comprising an optical coupling between said waveguides, arranged to transmit at least a portion of the Raman amplification signal from the first waveguide to the second whilst substantially blocking the transmission of the information signals between the waveguides.

16 Claims, 5 Drawing Sheets

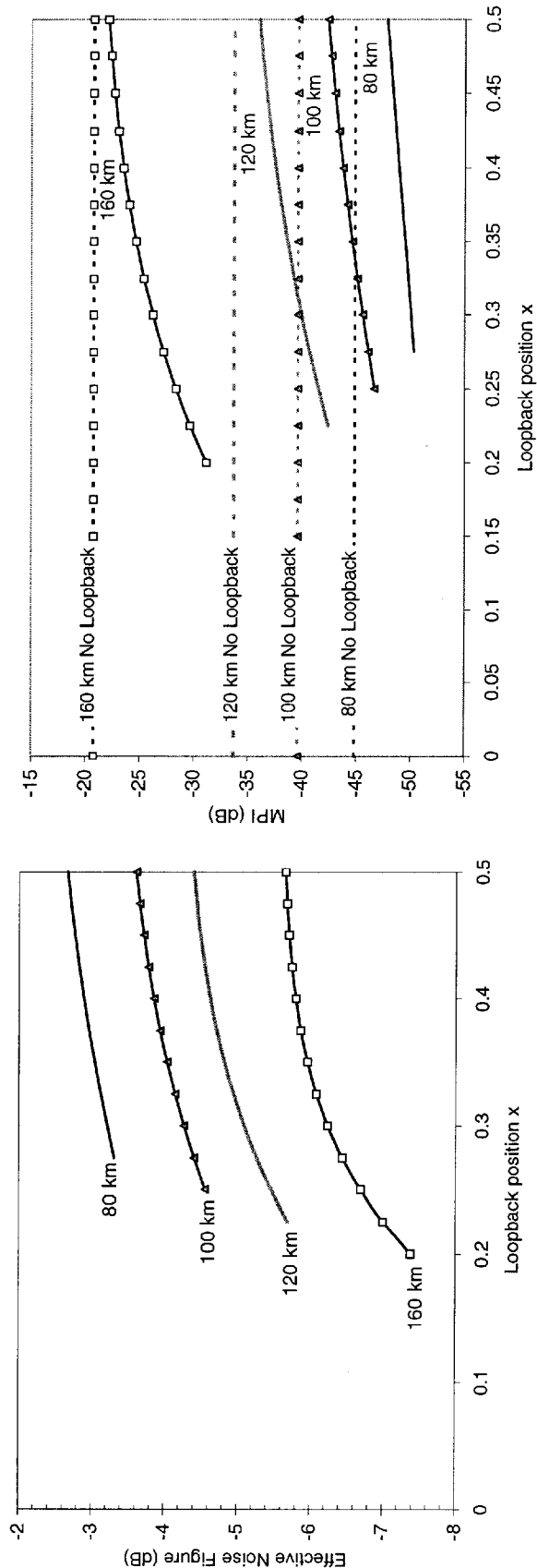
Fig. 5) Effective Noise figure and b) MPI for 80, 100, 120 & 160 km spans using loopbacks at fractional distance x. Dashed lines indicate MPI from distributed Raman amplification without loopbacks. S=0.002, attenuation is 0.2 dB/km.

RAMAN AMPLIFICATION

FIELD OF THE INVENTION

The present invention relates to Raman amplification, and in particular to a method and apparatus for providing Raman amplification that is suitable for, but not limited to, providing Raman amplification in a telecommunications system.

BACKGROUND OF THE INVENTION

Raman amplifiers use a non-linear effect called Raman scattering, whereby a small proportion of light at the pump frequency is scattered by the molecules in a medium (i.e. the optic fibre), and down shifted in frequency by an amount dependant on the vibrational modes of the medium. This down shifted light, called the Stokes wave, may have a fairly broad spectrum, the intensity of which is dependant on the fibre type and geometry. Stimulated Raman scattering (SRS) occurs when light at the same frequency as the Stokes wave is instant in the fibre, and results in the amplification of the incident light.

As the gain co-efficient is small, Raman amplifiers typically require long lengths of fibre (e.g. greater than 5 kilometers) to achieve satisfactory gain (e.g. greater than 20 dB). Distributed Raman amplification (Raman amplification in the transmission fibre) can thus be used to extend the reach of long-haul optical transmission systems by amplifying signals whilst they are in the transmission fibre, significantly proving the signal-spontaneous beat noise performance at the receiver. As the Raman pump power is increased, whilst the gain within the fibre also increases a noise effect called multi-path interference (MPI) can occur due to double Rayleigh scattering (DRS) of the signal.

FIG. 1 shows a short length of a fibre 10 in which DRS is occurring. The information signal light 12 is Rayleigh scattered 14 by small irregularities in the fibre. This results in a back scattered signal 16 travelling in the opposite direction to the information signal (i.e. it is counter propagating rather than co-propagating). This signal 16 may undergo Raman gain, and may be scattered again 18, resulting in a co-propagating DRS noise signal 20. Although the noise signal 20 has taken a different path than the information signal 12, and thus is likely to be incoherent, it does represent noise and can cause system penaltys. It is therefore desirable to limit the distance over which distributed Raman amplification is applied in a transmission fibre.

Relatively high power sources (e.g. 300 mW or greater) are used as Raman pumps. If such a signal is launched into an optical fibre, and the optical fibre broken, the resulting light output from the fibre could be exceptionally dangerous. Consequently, a shutdown mechanism is necessary. Conventional systems would rely upon the detection of the Raman pump signal at the end of the span (i.e at the next amplifying stage), with a signal being sent back via a supervisory system to the Raman pump source. Such a shutdown system has drawbacks. For instance, it requires the generation and transmission of a separate, supervisory signal. Also, due to the detection location at the end of the span, and the subsequent requirement to signal back to the Raman pump (typically at the start of the span) then the system is relatively slow. If the Raman pump is not located at the start of the span, then this can bring its own implementation problems e.g a separate power source is required for the Raman pump source.

It is an object of the present invention to address one or more of the problems of the prior art.

STATEMENT OF INVENTION

In one aspect, the present invention provides a system comprising a first optical waveguide suitable for transmitting a first information signal, a second optical waveguide suitable for transmitting a second information signal, and input means for providing an electro magnetic radiation signal into said first waveguide, said signal being suitable for providing Raman amplification of the information signals, the system further comprising an optical coupling between said waveguides, arranged to transmit at least a portion of the Raman amplification signal from the first waveguide to the second whilst substantially blocking the transmission of the information signals between the waveguides.

Consequently, such a system allows the sharing of a single Raman pump source between two optical waveguides carrying different information signals.

Preferably the system further comprises a detector means arranged to detect the transmission of the Raman amplification signal along the second waveguide. This allows a positive test that the Raman pump and the transmission fibre are functioning correctly.

For instance, said detector means can comprise an optical power detector, an optical tap coupling the second waveguide to the detector, and filtering means arranged to pass the Raman amplification signal but substantially block the transmission signals.

Preferably the system further comprises control means arranged to prohibit the provision of the Raman amplification signal into said first waveguide when said detector means does not detect the Raman amplification signal. This provides a safety mechanism in the event of a break in the optical path e.g. a fibre break.

The system may further comprise a source suitable for providing said Raman amplification signal.

Preferably, said detector means and said source are co-located. This allows the sharing of any of the power supply, control signals and control processor (hardware and/or software).

Preferably, said optical coupling comprises at least one of a dielectric coupler, an optical circulator, and a tapered fibre wavelength selective coupler.

Preferably the system further comprises an optical isolator arranged such so as to suppress multi-path interference. This may be provided in the form of an integral part of another component e.g. an optical circulator, or may be a separate component.

Preferably, the system is arranged such that the first information signal is substantially transmitted in the opposite direction to the second information signal, and the Raman amplification signal is transmitted along each respective waveguide in the opposite direction to the information signal for that waveguide. As the Raman amplification signal is counter propagating with respect to the information signals, the noise transfer between the Raman amplification signal and the information signals is less than for co-propagating Raman amplification and information signals.

Preferably the system further comprises at least one erbium amplifier arranged to amplify said first and second information signals, said system being arranged such that one of said information signals undergoes Raman amplification prior to amplification by said erbium amplifier, and the other information signal undergoes Raman amplification after amplification by said erbium amplifier. Of course, the system can include other discrete amplifiers (as distinct from a distributed amplifier), such as discrete Raman amplifiers, Thulium doped fibre amplifiers, or indeed any rare-earthed doped fibre amplifiers. However, discrete amplifiers need not be present if the distributed Raman amplification is sufficiently large.

Preferably, the amplifier and said Raman source are co-located.

In another aspect, the present invention provides a method of providing Raman amplification to a communications system, the system comprising a first optical waveguide suitable for transmitting a first information signal and a second optical waveguide suitable for transmitting a second information signal, the method comprising the steps of: providing an electro magnetic radiation signal into said first waveguide, said signal being suitable for providing Raman amplification of the information signals; and transferring at least a portion of the Raman amplification signal to said second waveguide.

Preferably the system further comprises the step of detecting the presence of the Raman amplification signal in said second waveguide.

Preferably, if the Raman amplification signal is not detected in said second waveguide, the electromagnetic radiation signal is prevented from entering into said first waveguide.

In a further aspect, the present invention provides a computer programme arranged to control a communications system so as to perform the method of providing Raman amplification to a communications system, the system comprising a first optical waveguide suitable for transmitting a first information signal and a second optical waveguide suitable for transmitting a second information signal, the method comprising the steps of: providing an electro magnetic radiation system into said first waveguide, said signal being suitable for providing Raman amplification of the information signals; and transferring at least a portion of the Raman amplification signal to said second waveguide.

The computer programme can be stored on a machine readable medium.

BRIEF DESCRIPTION OF THE DRAWINGS

In order that a greater understanding of the invention can be obtained, embodiments of the invention will now be described with reference to the accompanying drawings, by way of example only and without intending to be limiting, in which:

FIG. 5 shows respectively examples of effective noise figures and approximate MPI for 80, 100, 120 & 160 km spans using loopbacks at fractional distance x.

DESCRIPTION OF PREFERRED EMBODIMENT

Figure 1:
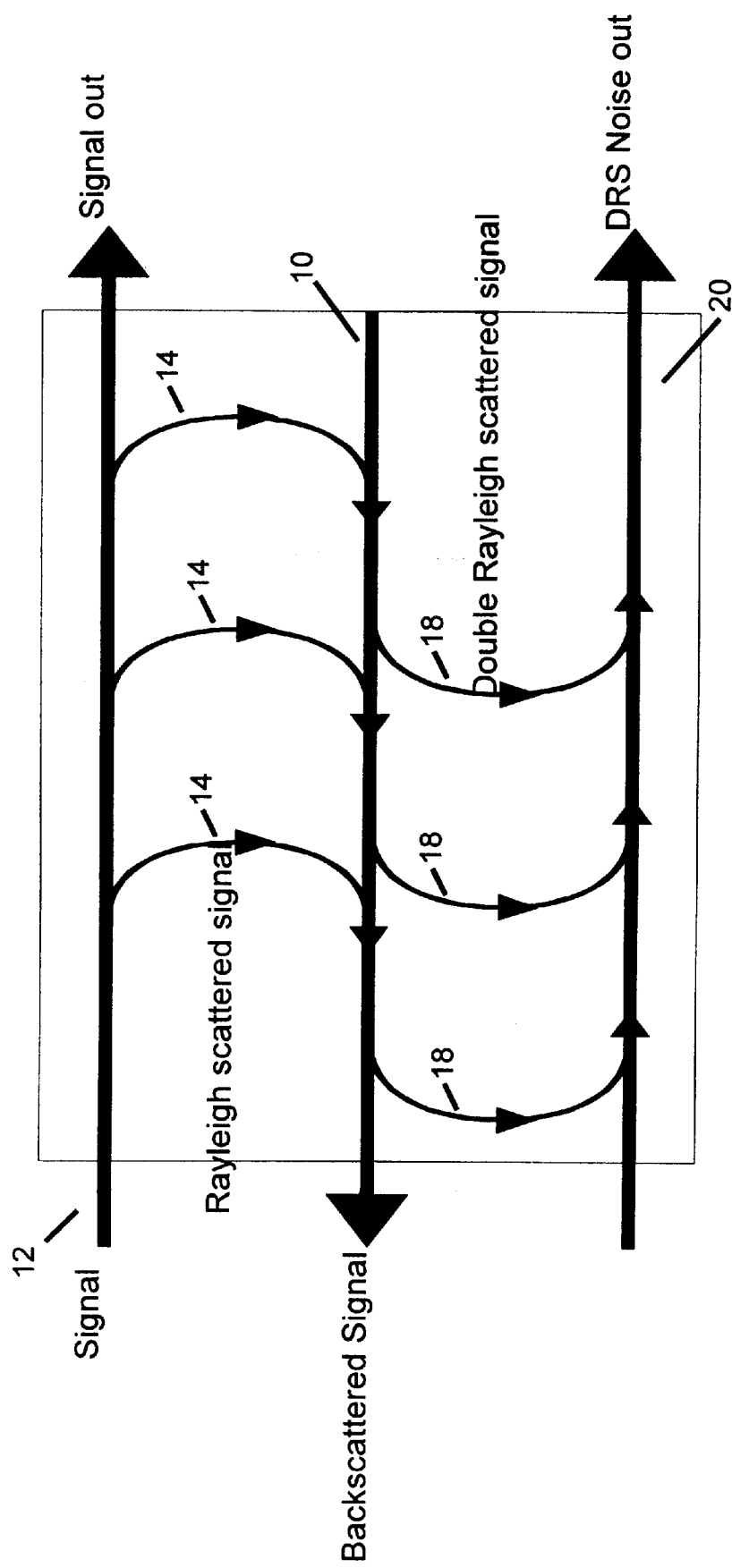
FIG. 1 shows double Rayleigh back scatter occurring in an optical fibre (PRIOR ART)
Figure 2:
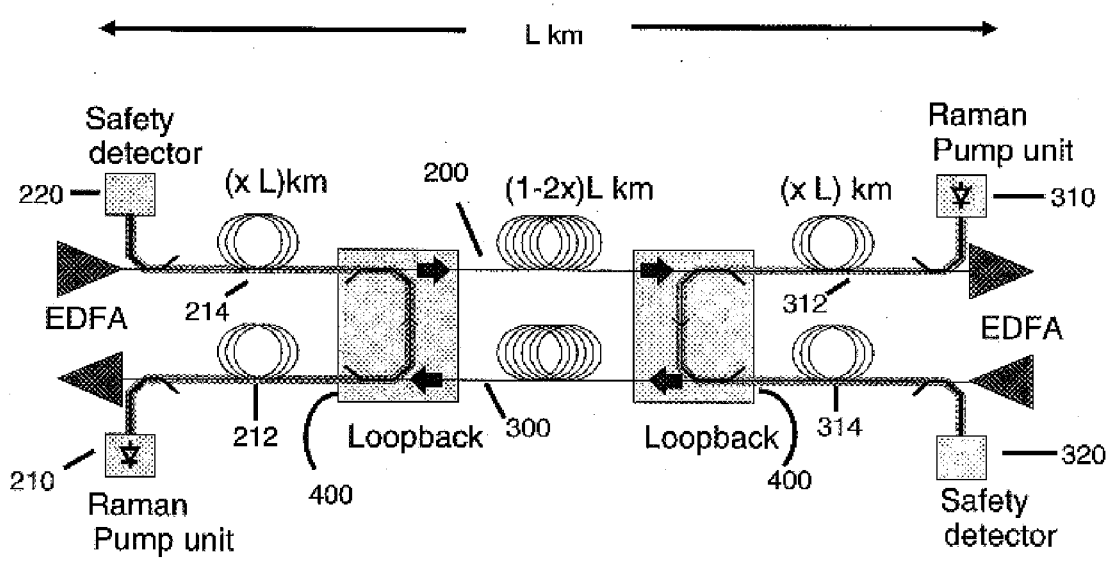
FIG. 2 shows a transmission system incorporating loopbacks according to a first embodiment of the present invention.

FIG. 2 shows a schematic of an optical communication system incorporating a preferred embodiment. The system comprises two transmission fibres (214, 200, 312;212, 300, 314) each of length L km, used to transmit information between the respective erbium doped amplifiers (EDFA). In this embodiment the fibres are used as unidirectional transmission lines, with the information signals carried by the fibres propagating in the opposite directions. For instance, the information signal transmitted along the upper fibre shown in the diagram (212,200,312) is shown as being transmitted from left to right, whilst that in the lower fibre (314,300,212) can be seen to be transmitted from right to left. Such a configuration is typical in many of today's optical systems, wherein unidirectional optical fibre pairs act to provide a bi-directional function.

Raman pump units (210,310) provide a source of electro magnetic radiation used to provide Raman amplification within the fibre. Each pump unit (210,310) is co-located with a respective EDFA. This allows the sharing of power supplies and control functions. Each pump unit is arranged to provide a Raman signal propagating in the respective fibre (212,312) in the opposite direction to the information signal. Such a counter-pumping scheme allows for any noise on the Raman pump to be averaged over the amplifier length, with noise transfer from the pump to the signal occurring less readily than if the pump and information signal were co-propagating.

Each pump unit (210,310) has a respective "loop back" 400 which is used to couple the Raman amplification signal from one transmission fibre to the other. In the configuration shown, the Raman signal is always coupled to the second transmission fibre so that it is once again counter propagating with respect to the information signal.

Associated with each Raman pump unit (210,310) is a respective safety detector (220, 320). Each safety detector is arranged to detect the presence of the Raman amplification signal. If no Raman amplification signal is detected, then the Raman pump unit is shut-off or blocked from entering the fibre, in case a break has occurred in the fibre. This does prevent any of the high power Raman amplification signal being transmitted from the fibre break. Preferably, each safety detector (220,320) is co-located with the respective Raman pump unit (210,310). This allows the sharing of power supplies, and minimises the distance that any control signals from the safety detector to the pump unit must travel.

Consequently, the system is arranged such that the Raman signal from unit 210 will propagate along length of (x L)km fibre 212 (where x is a fraction; $0 < x \leq 0.5$), around the loop back 400, along length (x L) km of fibre 214 and can be detected by the safety detector 220. If desired, a filter may be inserted on the transmission line such that all of the Raman signal on the fibre 214 is diverted towards the safety detector 220. This may be exactly the same filter as used in the pump unit 210.

As shown in FIG. 2, the Raman signal is transmitted from unit 210 to detector 220 via two lengths of fibre (212, 214). A typical example would be for xL=15 km, L=100 km, and (1−2x) L=70 km. However, it will be appreciated that the loop back could be implemented at any position desired or for any length of the transmission fibre. Equally it will be appreciated that the fibre lengths 212,214,312 and 314 could all be of different lengths, or any two or more could be of the same length.

Equally, the Raman radiation from unit 310 is transmitted along fibre length 312 through loop back 400 and via fibre length 314 to the safety detector 320.

Such a scheme provides Raman amplification both pre and post signal amplification by the erbium amplifiers, whilst only utilising counter-pumped methodology. It provides an easy to implement and reliable safety mechanism. It permits efficient use of the Raman pump, allowing a single Raman pump unit to provide Raman amplification along two distinct transmission fibres. Finally, as the Raman signal is only propagated along a fraction of each of the total length of transmission fibre, it reduces multi-path interference compared with allowing the Raman signal to propagate uninterrupted along the whole transmission fibre.

Figure 3A:
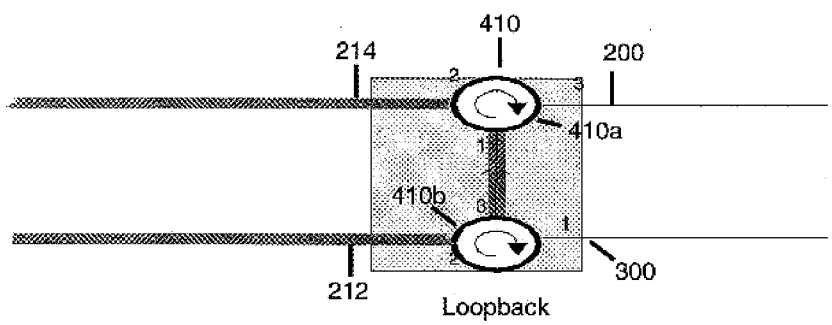
FIGS. 3a and 3b show the implementation of a loopback using a 3 port optical circulator and a 4 port optical circulator respectively.
Figure 3B:
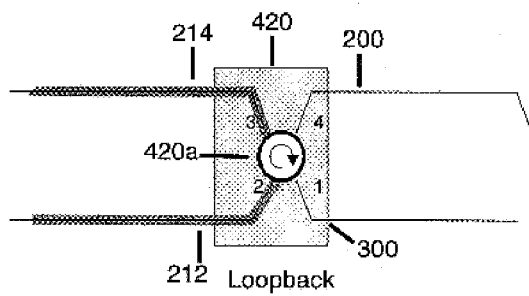

It will be appreciated that the loop backs could be implemented in a number of ways. For instance, a loop back could take the form of a dielectric coupler, separating the Raman pump wavelengths from the signal wavelengths, and can include an isolator that further reduces MPI. Alternately, as shown in FIG. 3a, a loop back 410 could be implemented utilising 2 3 port optical circulators 410a, 410b. Alternately, as shown in FIG. 3b, a single 4-port optical circulator 420a could be utilised to provide the loop back 420. Alternately, a tapered fibre wavelength selective coupler could be utilised.

Thus, the present invention can be utilised by placement of the loop back in the form of a few small passive components along the length of the transmission fibre. Typically, transmission of fibres are laid in lengths of 10 or 15 km, with access being provided by man hole covers. Thus it will be appreciated that, as no additional power or control mechanisms are required at the loop back site, installation of the loop back will be a relatively simple matter.

Figure 4:
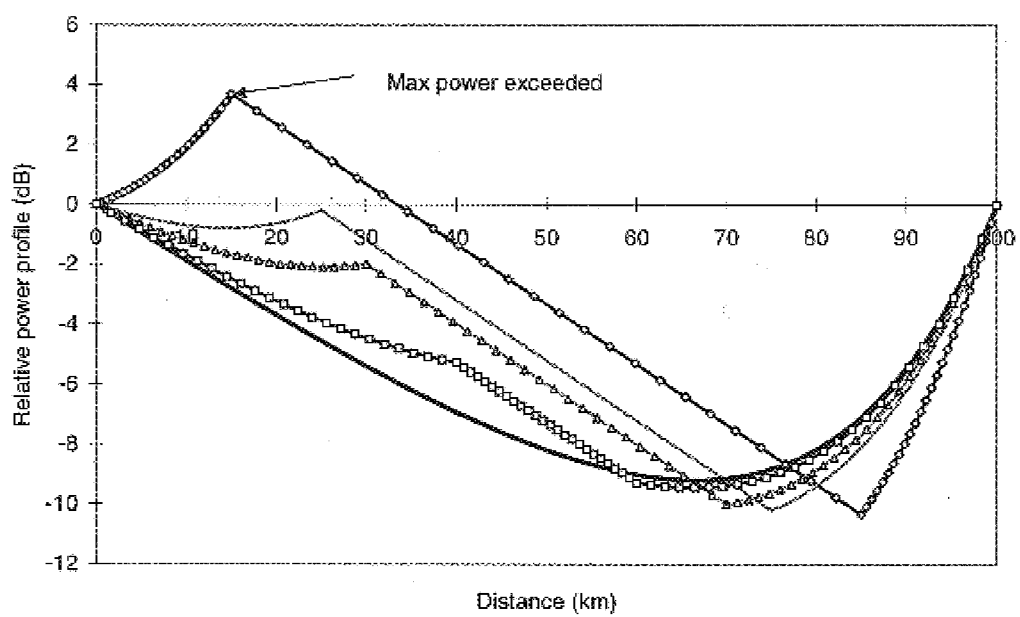
FIG. 4 shows examples of power profiles along a 100 km fibre for various loopback positions (x) along the length of the fibre (gain equals 20 dB, attenuation equals 0.2 dB/km)

The placement of the loop backs allows gain to be transferred from the end of the transmission fibre to the start. FIG. 4 shows the relative power profile of an information signal as it traverses 100 km of fibre for the case where overall the Raman gain is equal to the fibre loss. The discontinuities indicate the position of the loop backs. It can be seen that as the loop back position is moved closer to the end of the span, thus reducing x, there is a larger amount of residual pump which causes greater gain closer to the post amplifier.

By way of example of the system improvement gained when utilising loop backs, FIGS. 5a and 5b show results for 80, 100, 120 and 160 km systems where the span loss is completely compensated for using distributed Raman amplification, corresponding to added Raman gains of 16, 20, 24 and 32 db respectfully. In such instances, the erbium pre-amplifier could be removed.

FIG. 5a shows the effective noise figure for the system spans using loop backs. In this case, a system without loop backs corresponds to the loop back position x=0.5. In this example, the lines do not extend to x=0 since for some values of x, the peak power of the system exceeds the launch signal power and the gain would need to be reduced. This example is based on the premise that the launch power is the maximum desired power, although it is appreciated that is may be appropriate for instantaneous information signal power to exceed the launch power at some positions within the transmission fibre. It can be seen that there is between 1 and 1.7 dB improvement in the effective noise figure for these various span lengths compared to the case where loop backs are not used. Importantly, as shown in FIG. 3b, the MPI is dramatically reduced by between 5 and 10 dB. There is even some reduction in MPI when the loop back is placed at the centre of the transmission fibre (x=0.5), since the loop back typically contains an isolator.

As there is an improvement in the effective noise figure, and a reduction in double Rayleigh scatter, this allows for greater fibre span lengths and higher Raman gains to be utilised in optical transmission systems.

It will be appreciated that the foregoing is provided by way of example only, and that various modifications will be apparent to a skilled person.

For instance, whilst the present invention has been described in conjunction with optical fibre transmission lines, it will be appreciated that any optical waveguide suitable for providing Raman amplification could be utilised.

For the purpose of this specification, the terms "optical" and "light" should be understood as pertaining not only to the visible part of the electromagnetics spectrum but also to the infra-red and ultra-violet parts that bound the visible part.

Any range as given herein may be extended or altered without losing the effects sought, as will be apparent to a skilled person from an understanding of the teaching of the invention.

What is claimed is:

1. An optical transmission system comprising a first optical waveguide suitable for transmitting a first information signal, a second optical waveguide suitable for transmitting a second information signal different from the fir information signal, the first and second waveguides extending along substantially a full length of transmission path of the system, and input means for providing an electro magnetic radiation signal into said first waveguide, said signal being suitable for providing distributed Raman amplification of the information signals along at least part of the transmission path, the system further comprising an optical coupling between said waveguides, arranged to transmit at least a portion of the Raman amplification signal from the first waveguide to the second after the Raman amplification signal has travelled along at least part of the transmission path, whilst substantially blocking the transmission of the information signals between the waveguides.

2. A system as claimed in claim 1, wherein said optical coupling comprises at least one of a dielectric coupler, an optical circulator, and a tapered fibre wavelength selective coupler.

3. A system as claimed in claim 1, further comprising an optical isolator arranged such so as to suppress multi-path interference.

4. A system as claimed in claim 1, wherein said system is arranged such that the first information signal is substantially transmitted in the opposite direction to the second information signal, and the Raman amplification signal is transmitted along each respective waveguide in the opposite direction to the information signal for that waveguide.

5. A system as claimed in claim 1, further comprising at least one erbium amplifier arranged to amplify said first and second information signals, said system being arranged such that one of said information signals undergoes Raman amplification prior to amplification by said erbium amplifier, and the other information signal undergoes Raman amplification after amplification by said erbium amplifier.

6. A system as claimed in claim 1, further comprising a source suitable for providing said Raman amplification signal.

7. A system as claimed in claim 6 wherein said amplifier and said Raman source are co-located.

8. A system as claimed in claim 1, further comprising a detector means arranged to detect the transmission of the Raman amplification signal along the second waveguide.

9. A system as claimed in claim 8, wherein said detector means comprises an optical power detector, an optical tap coupling the second waveguide to the detector, and filtering means arranged to pass the Raman amplification signal but substantially block the transmission signals.

10. A system as claimed in claim 9, wherein said detector means and said source are co-located.

11. A system as claimed in claim 8, further comprising control means arranged to prohibit the provision of the Raman amplification signal into said first waveguide when said detector means does not detect the Raman amplification signal.

12. A method of providing distributed Raman amplification to a communications system, the system comprising a first optical waveguide suitable for transmitting a first information signal the first and second waveguides extending along substantially a full length of a transmission path of the system, and a second optical waveguide suitable for transmitting a second information signal different from the first information signal, the method comprising the steps of:

provideing an electro magnetic radiation signal into said first waveguide, said signal being suitable for providing distributed Raman amplification of the information signals along at least part of the transmission path; and transferring at least a portion of the Raman amplification signal to said second waveguide after the Raman amplification signal has travelled along part of the transmission path.

13. A method as claimed in claim 12, further comprising the step of detecting the presence of the Raman amplification signal in said second waveguide.

14. A method as claimed in claim 13, wherein if the Raman amplification signal is not detected in said second waveguide, the electromagnetic radiation signal is prevented from entering into said first waveguide.

15. A computer programme arranged to control a communications system so as to perform the method of providing distributed Raman amplification to a communications system, the system comprising a first optical waveguide suitable for transmitting a first information signal and a second optical waveguide suitable for transmitting a second information signal differing from the first, the first and second waveguides extending along substantially a full length of a transmission path of the system, the method comprising the steps of:

providing an electro magnetic radiation system into said first waveguide, said signal being suitable for providing distributed Raman amplification of the information signals; and transferring at least a portion of the Raman amplification signal to said second waveguide after the Raman amplification signal has travelled along part of the transmission path.

16. A computer programme as claimed in claim 15, stored on a machine readable medium.

* * * * *